(12) United States Patent
Bottiglieri et al.

(10) Patent No.: US 7,652,992 B2
(45) Date of Patent: Jan. 26, 2010

(54) TWO TIER TRAFFIC SHAPER APPROACH FOR RESILIENT PACKET RING STATIONS

(75) Inventors: Michael P. Bottiglieri, River Vale, NJ (US); Wendy Lao, Paramus, NJ (US); Sanjay Kumar Sharma, Wayne, NJ (US); Nitin Gogate, Montvale, NJ (US)

(73) Assignee: Fujitsu Limited, Kawasaki (JP)

( * ) Notice: Subject to any disclaimer, the term of this patent is extended or adjusted under 35 U.S.C. 154(b) by 512 days.

(21) Appl. No.: 11/314,364

(22) Filed: Dec. 22, 2005

(65) Prior Publication Data

US 2006/0274770 A1 Dec. 7, 2006

Related U.S. Application Data

(60) Provisional application No. 60/687,320, filed on Jun. 6, 2005.

(51) Int. Cl.
*G01R 31/08* (2006.01)
(52) U.S. Cl. ........................ 370/230; 370/412
(58) Field of Classification Search .......... 370/395.21, 370/395.4, 395.42, 412, 230
See application file for complete search history.

(56) References Cited

U.S. PATENT DOCUMENTS

| 7,006,440 | B2 * | 2/2006 | Agrawal et al. ............. 370/235 |
| 2006/0007854 | A1 * | 1/2006 | Yu .............................. 370/229 |

* cited by examiner

*Primary Examiner*—Chirag G Shah
*Assistant Examiner*—Minh-Trang Nguyen
(74) *Attorney, Agent, or Firm*—Hanify & King, PC (57) ABSTRACT

RPR traffic management concepts are extended to individual client flows while adhering to the station level traffic management functions by using a two tiered shaper approach. The first tier manages the client level SLAs and feeds the second tier which provides the aggregate station level traffic management functions. This approach allows sharing of a single RPR station without the compromises and side affects associated with the other techniques. Apparatus for Resilient Packet Ring traffic management comprises a stage queue selection block operable to hold client and control traffic for transmission, a queue level traffic shaper operable to control an add rate of client data add traffic and to provide queue specific send indications to the stage queue selection block, and a ringlet level traffic shaper operable to control traffic flow for a Resilient Packet Ring ringlet and to provide aggregate send indications to the stage queue selection block.

20 Claims, 5 Drawing Sheets

TWO TIER TRAFFIC SHAPER APPROACH FOR RESILIENT PACKET RING STATIONS

CROSS-REFERENCE TO RELATED APPLICATIONS

This application claims the benefit of Provisional Application No. 60/687,320, filed Jun. 6, 2005.

BACKGROUND OF THE INVENTION

1. Field of the Invention

The present invention relates to a system and method for extending RPR traffic management concepts to individual client flows while adhering to the station level traffic management functions described in the 802.17 specification by using a two tiered shaper approach.

2. Description of the Related Art

Resilient Packet Ring (RPR), specified in IEEE standard 802.17, is a standard designed for the optimized transport of data traffic over fiber rings. It is designed to provide the resilience found in SONET/SDH networks (50 ms protection), but instead of setting up circuit oriented connections, it provides a packet-based transmission. This is to increase the efficiency of Ethernet and IP services.

RPR works on a concept of dual counter rotating rings called ringlets. These ringlets are setup by creating RPR stations at nodes where traffic is supposed to drop, per flow (a flow is the ingress and egress of data traffic). Each ring segment used to transport data between stations is referred to as a span. RPR uses MAC (Media Access Control protocol) messages to direct the traffic, which traverses both directions around the ringlet. The nodes also negotiate for bandwidth among themselves using fairness algorithms, avoiding congestion and failed spans. The avoidance of failed spans is accomplished by using one of two techniques known as "steering" and "wrapping". Under steering if a node or span is broken all nodes are notified of a topology change and they reroute their traffic. In wrapping the traffic is looped back at the last node prior to the break and routed to the destination station.

IEEE Standard 802.17 specifies RPR station level traffic shapers to control access to and dynamic sharing of available ring bandwidth. However, for systems that require the merging of multiple independent clients, each with individual traffic contracts, into a single RPR station, the need arises to add traffic management functionality at the client level. While doing so, strict adherence to the station level traffic management functions must still be maintained to be compliant with the ring level operation described in the 802.17 specification. A need arises for a technique by which the RPR traffic management concepts may be extended to individual client flows that adhere to the station level traffic management functions described in the 802.17 specification.

SUMMARY OF THE INVENTION

The present invention provides the capability of extending the RPR traffic management concepts to individual client flows while adhering to the station level traffic management functions described in the 802.17 specification by using a two tiered shaper approach. The first tier manages the client level SLAs and feeds the second tier which provides the aggregate station level traffic management functions. This approach allows sharing of a single RPR station without the compromises and side affects associated with the other techniques.

In one embodiment of the present invention, apparatus for Resilient Packet Ring traffic management comprises a stage queue selection block operable to hold client and control traffic for transmission, a queue level traffic shaper operable to control an add rate of client data add traffic and to provide queue specific send indications to the stage queue selection block, and a ringlet level traffic shaper operable to control traffic flow for a Resilient Packet Ring ringlet and to provide aggregate send indications to the stage queue selection block.

In one aspect of the present invention, the queue level traffic shaper may comprise Class-A, Class-B CIR, pre-congestion Fairness Eligible, and post-congestion Fairness Eligible shapers. The ringlet level traffic shaper may comprise Class-A, Class-B, fairness eligible pre-congestion, fairness eligible post-congestion, MAC Control, downstream, and IDLE shapers. The apparatus may further comprise a distinct MAC client instance per LAN port. The apparatus may further comprise client instances that share a MAC service interface and station resources.

In one aspect of the present invention, the queue level traffic shaper may be further operable to compensate for client tier head of line blocking and the ringlet level traffic shaper is further operable to compensate for ring level head of line blocking. The queue level traffic shaper may be further operable to be configured based on a client level service level agreement and the ringlet level traffic shaper is further operable to to be configured to handle aggregate station level traffic management. The queue level traffic shaper may be further operable to be configured according to:

$$ClientX\_hiLimitA = mtuSize +$$

$$[(numClients-1)*mtuSize*Client\_addrateA/addrateA] +$$

$$[numStations*mtuSize/2*Client\_addrateA/(lineRate-addrateA)],$$

wherein numStations equals a number of Resilient Packet Ring Stations on the ring, mtuSize equals a Maximum Transmit Unit Size, lineRate equals a Ring bandwidth, numClients equals a Number of Class A Clients in the client tier, addRateA equals a Credit accumulation rate for Class A ringlet shaper, and Client_addRateA equals a Credit accumulation rate for the queue level traffic shaper.

In one aspect of the present invention, the queue level traffic shaper may comprise Class-A, Class-B CIR, pre-congestion fairness Eligible, and post-congestion fairness eligible shapers. The ringlet level traffic shaper may comprise Class-A, Class-B, fairness eligible pre-congestion, fairness eligible post-congestion, MAC Control, downstream, and IDLE shapers.

BRIEF DESCRIPTION OF THE DRAWINGS

The preferred embodiments of the present invention will be described with reference to the accompanying drawings.

DETAILED DESCRIPTION OF THE PREFERRED EMBODIMENTS

The present invention provides the capability of extending the RPR traffic management concepts to individual client flows while adhering to the station level traffic management functions described in the 802.17 specification by using a two tiered shaper approach. The first tier manages the client level SLAs and feeds the second tier which provides the aggregate station level traffic management functions. This approach allows sharing of a single RPR station without the compromises and side affects associated with the other techniques.

Figure 1:
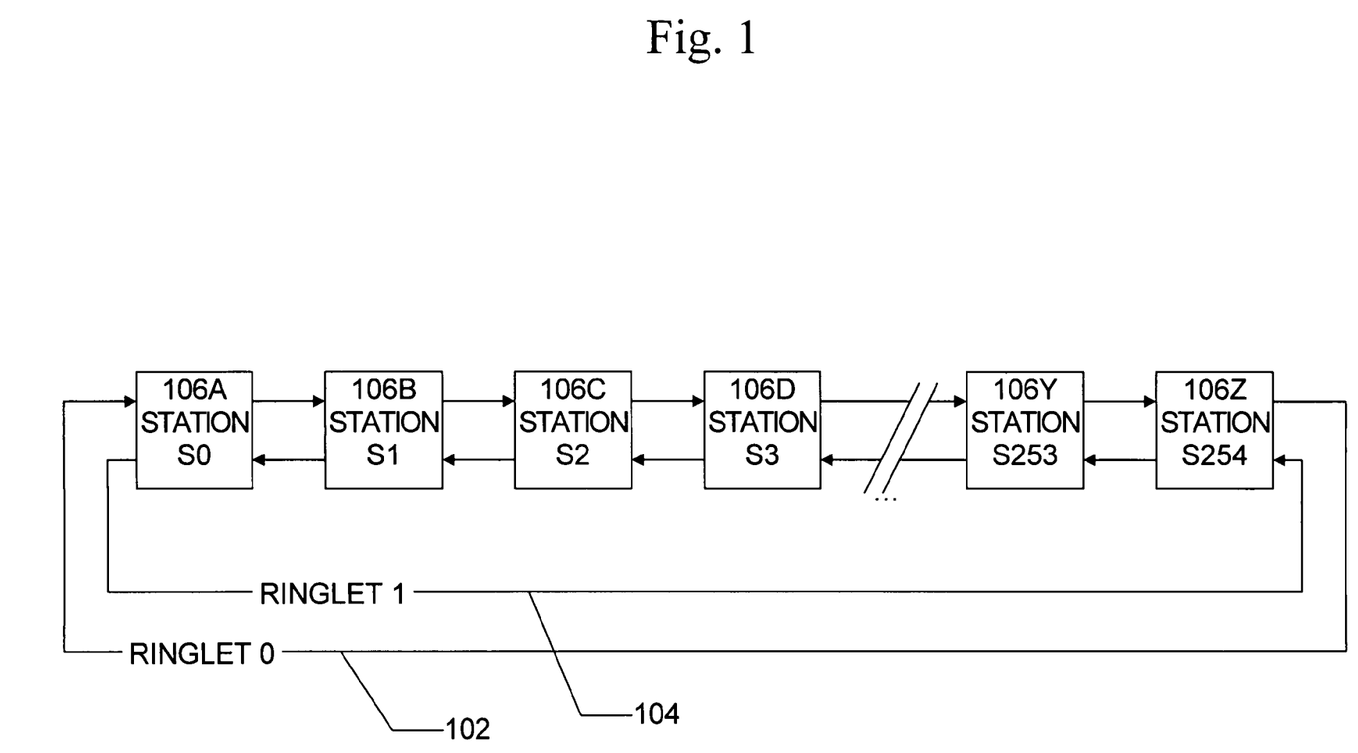
FIG. 1 is an exemplary block diagram of an RPR ring structure.

An example of an RPR ring structure 100 is shown in FIG. 1. RPR employs a ring structure using unidirectional, counter-rotating ringlets. Each ringlet is made up of links with data flow in the same direction. The ringlets are identified as ringlet0 102 and ringlet1 104, as shown in FIG. 1. The association of a link with a specific ringlet is not altered by changes in the state of the links or stations. Stations on the ring, such as stations 106A-N, are identified by an IEEE 802 48-bit MAC address as specified in IEEE Std. 802-2002. All links on the ring operate at the same data rate, but they may exhibit different delay properties. The portion of a ring bounded by adjacent stations is called a span. A span is composed of unidirectional links transmitting in opposite directions. StationY is said to be a downstream neighbor of stationX on ringlet0 102/1 if the stationX traffic becomes the receive traffic of stationY on the referenced ringlet. Thus, station S5 is the downstream neighbor of station S4 on ringlet0 102; similarly station S2 is the downstream neighbor of station S3 on ringlet1 104. StationY is said to be an upstream neighbor of stationX on ringlet0/1 102,104 if the stationY traffic becomes the receive traffic of station X on the referenced ringlet. Thus, station S4 is the upstream neighbor of station S5 on ringlet0 102; similarly station S3 is the upstream neighbor of station S2 on ringlet1 104.

Figure 2:
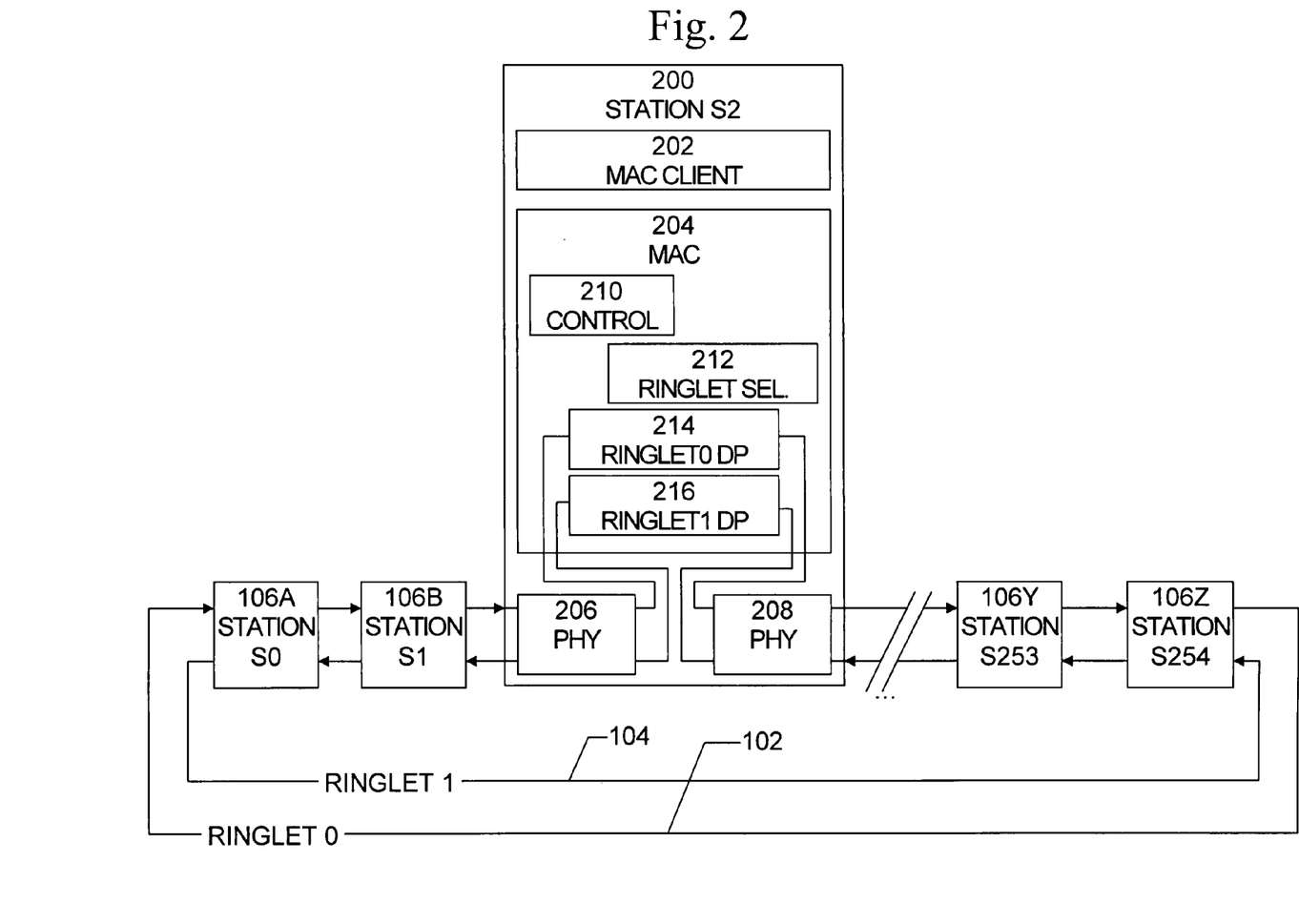
FIG. 2 is an exemplary block diagram of a station in the RPR ring structure shown in FIG. 1.

An example of a station 200 in an RPR ring structure 100 is shown in FIG. 2. Station 200 includes one client entity 202, one MAC entity 204, and two PHY entities 206, 208. Each PHY 206, 208 is associated with a span shared with a neighboring station. The MAC entity 204 contains one MAC control entity 210, a ringlet selection entity 212, and two datapath entities 214, 216 (one datapath is associated with each ringlet). The PHY 208 transmitting on ringlet0 102 and receiving on ringlet1 104 is identified as the east PHY 208. The PHY 206 transmitting on ringlet1 104 and receiving on ringlet0 102 is identified as the west PHY 206. The ringlet0 102 datapath receives frames from the west PHY 206 and transmits or retransmits frames on the east PHY 208. The ringlet1 104 datapath receives frames from the east PHY 208 and transmits or retransmits frames on the west PHY 206.

An 802.17 compliant rate control subsystem governs transmit traffic priority and both sustained and burst ringlet add rates. The RPR specification requires implementation of 6 shaper instances per Ringlet; namely, Class-A, Class-B, fairness eligible pre-congestion, fairness eligible post-congestion, MAC Control and Downstream. It also specifies on optional IDLE Shaper. This seven shaper suite is adequate for handling traffic management for a single RPR MAC Client but is insufficient to support multiple clients sharing the resources of a single station. These clients may be logical flows that share a common service interface (e.g. VLANs on an 802.3 LAN port) or flows distinguished by the associated service interface (e.g. Implicit, port based VLAN). The present invention addresses the insufficiencies of the standard's transmit subsystem, extending it to allow multiple clients to share the resources of a single RPR station.

Figure 3:
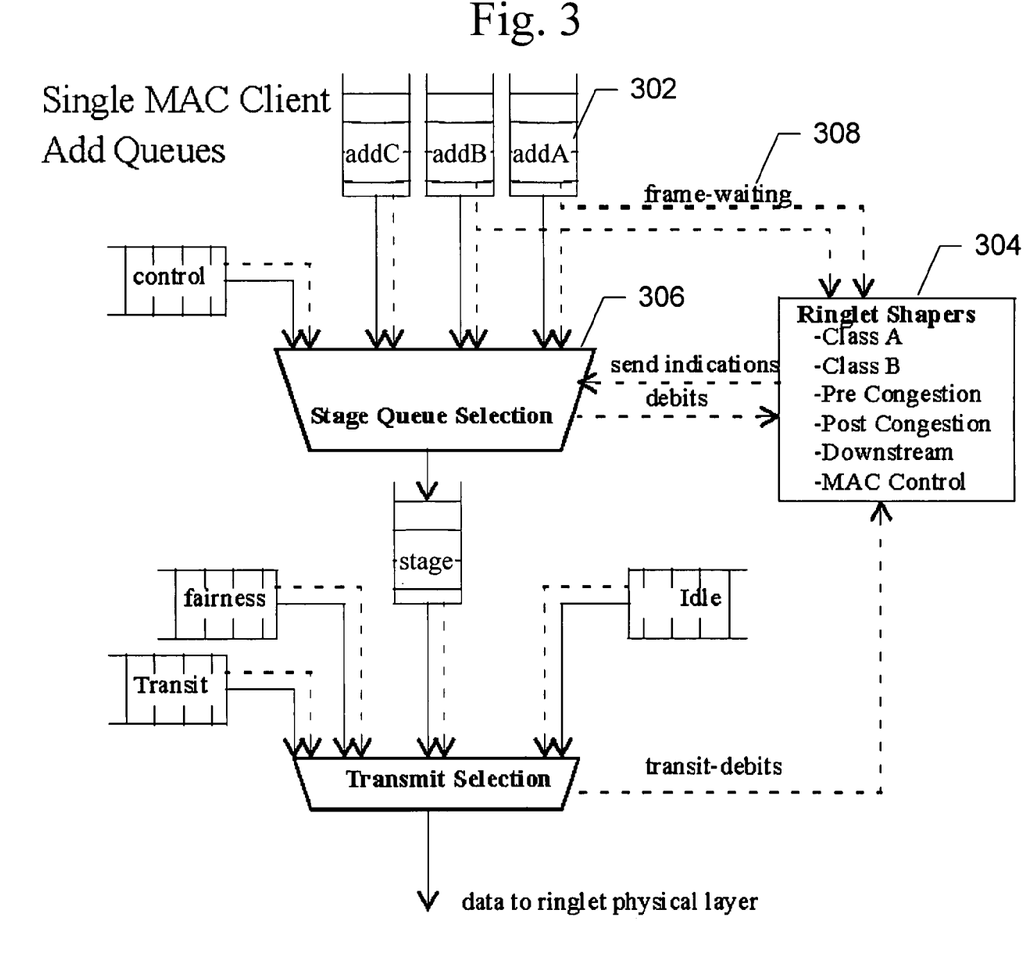
FIG. 3 is an exemplary block diagram of elements that form a ringlet transmit subsystem as specified in the 802.17 Standard.

An example of the operational relationship between the elements that form the ringlet transmit subsystem is shown in FIG. 3. Specifically, the Client Add Queues 302, Ringlet Shapers 304, and Stage Queue Selection 306 blocks are shown. The remaining elements are illustrated to provide additional context for the functionality.

The RPR MAC client offers data via three logical "add Queues" each corresponding to one 802.17 traffic class; Class-A, Class-B, and Class-C. The Ringlet Shaper functional block 304 represents the collection of traffic shapers which maintain credits for each traffic class as well as the RPR MAC control, Idle and Downstream components. These shapers are specified as credit buckets which have adjustable credit accumulation rates (a.k.a. addRates). The shapers have two adjustable thresholds referred to as loLimit and hiLimit. The loLimit specifies the minimum number of accumulated credits required before frames governed by a given shaper can be considered for transfer; indicated by the assertion of a send-indication. The loLimit is typically configured for a value of one MTU. The hiLimit specifies the maximum number of credits that can be accumulated by a shaper. Upon reaching the hiLimit, credit accumulation ceases. The hiLimit is set to a value that is greater than or equal to that of the loLimit. The hiLimit serves multiple purposes.

It prevents overflow of the finite depth credit buckets.

It puts a limit on the maximum burst length for the traffic governed by the shaper.

It allows for sufficient accumulation of credits above the loLimit to compensate for head of line blocking experienced due to higher priority transit traffic.

To achieve the behavior described in the third bullet, the Committed Information Rate (CIR) Shapers (Class-A and Class-B) accumulate credits above the loLimit only when frames governed by the shaper are waiting to be transferred. The "frame-waiting" knowledge required for this function is illustrated in FIG. 3 by the "frame-waiting indications" 308 that are passed from the add queues 302 to the shaper block 304. The standard provides equations which are used to calculate the required hiLimit settings. These are summarized for both Class A and Class B traffic as follows:

$$hiLimitA = mtuSize + addRateA * MAX\_JITTER/2,$$

where $$MAX\_JITTER = (numStations*(mtuSize/lineRate))/(1-(addRateA/lineRate));$$

and $$hiLimitB = (2*numStations*mtuSize + (FRTT*lineRate))*(addRateB/lineRate);$$

where:
numStations=>Number of RPR Stations on the ring,
mtuSize=>Maximum Transmit Unit Sizeline,
Rate=>Ring bandwidth,
FRTT=>Fairness Round Trip Trip,
addRateA=>Credit accumulation rate for Class A, and
addRateB=>Credit accumulation rate for Class B.

The Stage Queue Selection function is essentially a frame level arbitration module that considers the frame waiting status from both the client add queues and MAC level control queues and their associated shaper controlled send indications. Based on this information and the priority specified by the standard, the Stage Queue Selection function selects the next add frame to be offered to the ring and indicates the number of debits (credit deductions) to be applied to the relevant shaper credit buckets based on frame length.

Figure 4:
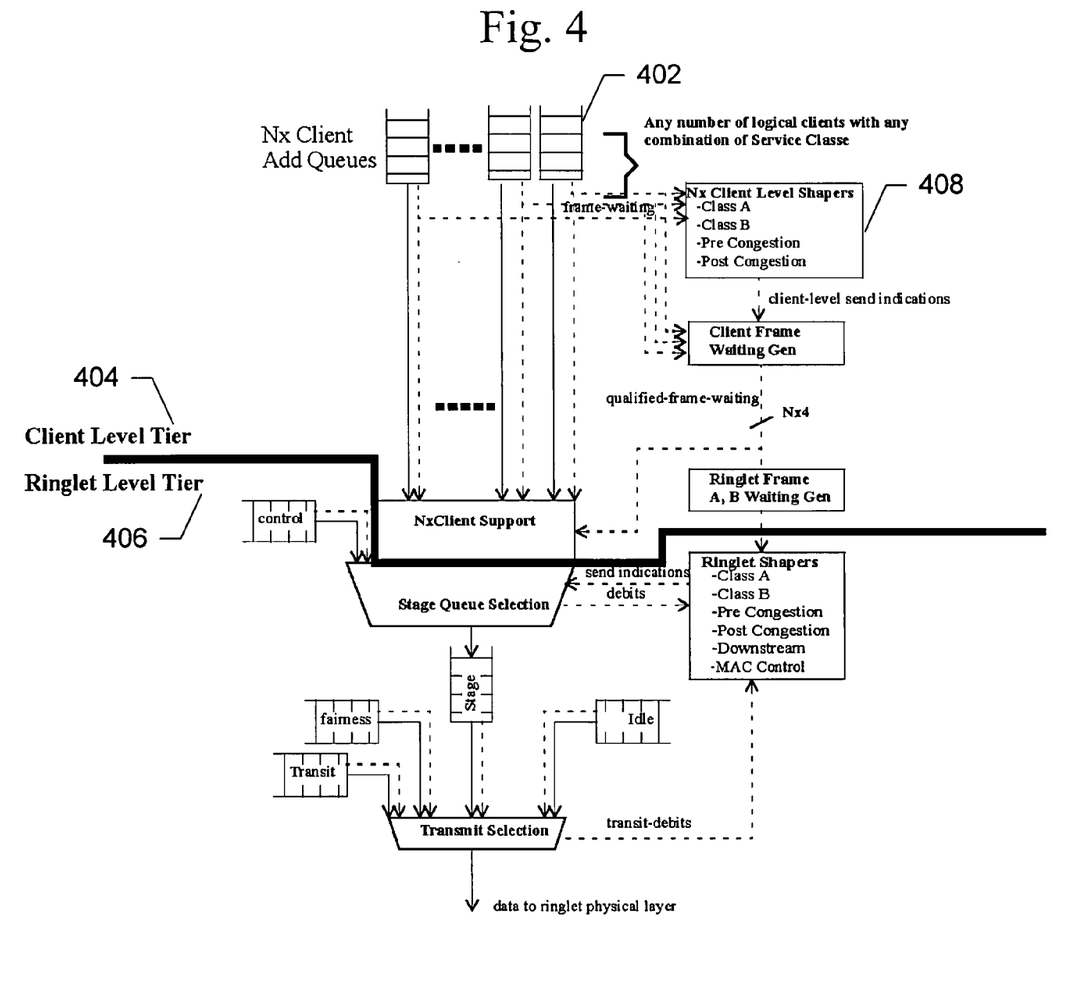
FIG. 4 is an exemplary block diagram of elements that form the extended ringlet transmit subsystem of the present invention supporting an arbitrary number of logical service queues.

An exemplary block diagram of an extension to the 802.17 MAC level service capabilities of a single RPR station to support multiple independent clients (or flows) is shown in FIG. 4. It is not intended to restrict the physical partitioning of an implementation but instead provide a logical partition to facilitate description of the approach. As depicted, an arbitrary number of client queues 402, with an arbitrary combination of service classes, can be supported. Each queue can be independently configured to comply with its own service level agreement (SLA). To aide in the description, the approach is modeled as a two tier traffic management configuration; possessing a ringlet level tier 406 and a client level tier 404. The ringlet level tier is similar in functionality to that which is covered by the 802.17 standard and previously summarized. The client level tier manages the multiple clients and provides an interface to the ringlet tier which is as specified in the standard.

As shown in FIG. 4, the client tier supports an arbitrary number (N) of logical service queues. These queues (logical or physical) represent data flows for which a distinct SLA is required. Each queue is provided with a dedicated, independently configurable collection of traffic shapers, which are collectively housed in the "N×Client Shaper" block 408 of FIG. 4. For example, a queue configured for Class B CIR would simply instantiate a Class-B client shaper, while another queue supporting Class B CIR and EIR components would instantiate a Class-B, Pre-Congestion, and Post Congestion shaper. The queue shapers generate queue level send (or equivalently "pass") indications which indicate the transmission eligibility status on per client queue basis. In addition, each instantiated client CIR shaper monitors its own queue frame availability status for handling credit accumulation above its configured lolimit (for identical reasons described previously for the ring level CIR shapers).

Figure 5:
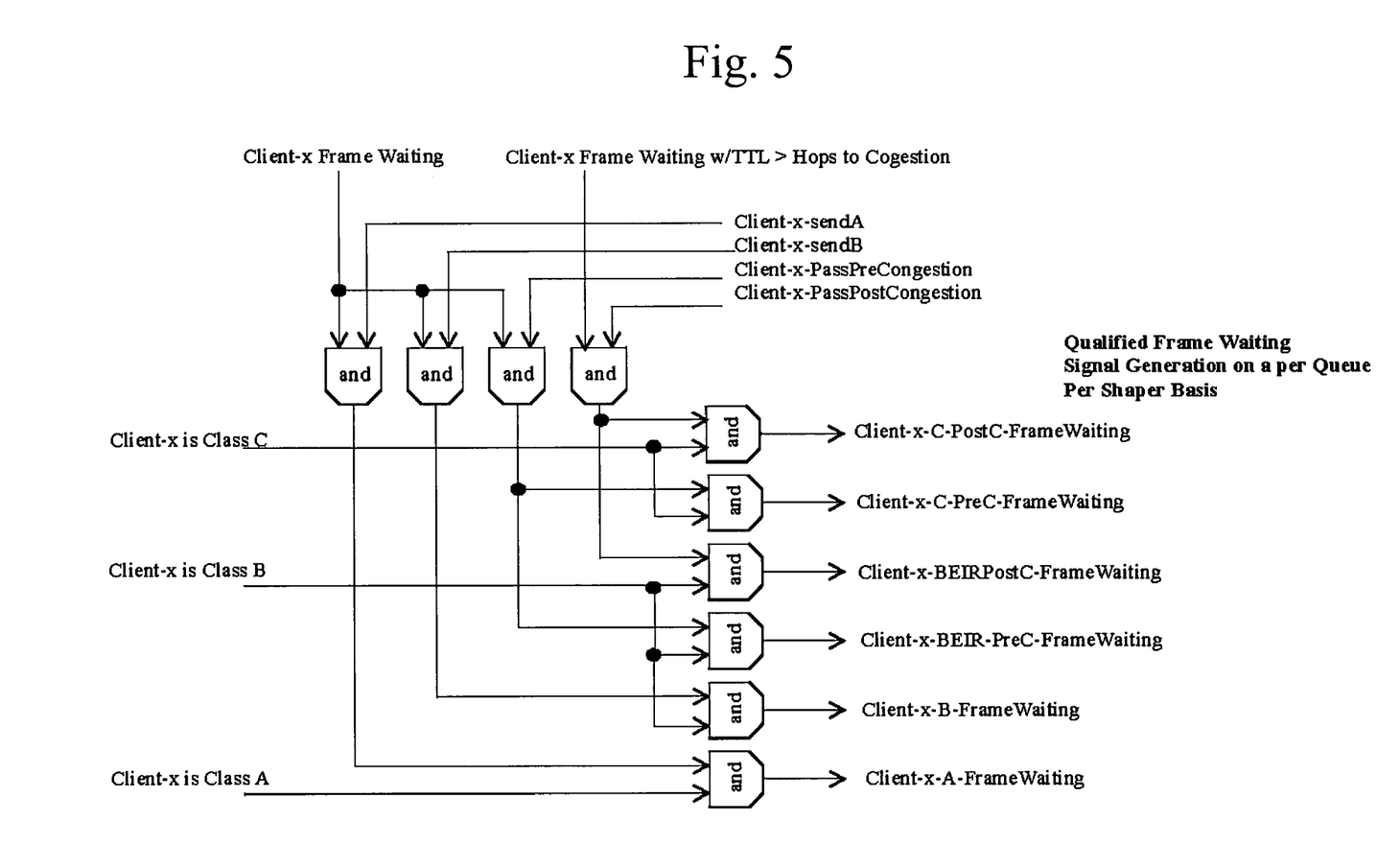
FIG. 5 is an exemplary block diagram of the logic of the "Client Frame Waiting Qualification" function which is part of the extended transmit subsystem of the present invention.

FIG. 5 is an exemplary block diagram of the logic of the "Client Frame Waiting Qualification" function. The frame-available indications for each client queue are conditioned by a "Client Frame Waiting Qualification" function. This function qualifies the frame waiting signal from each queue with the four send/pass indications from the associated client level shapers as well as the configured service class as illustrated in FIG. 5. The logical "Or" of the all the qualified Client-x-A-FrameWaiting signals is passed to the Ringlet Shaper module to allow Class-A Shaper credit accumulation beyond the lolimit. The logical "Or" of the all the qualified Client-x-B-FrameWaiting signals is passed to the Ringlet Shaper module to allow Class-B Shaper credit accumulation beyond the lolimit. The qualified frame waiting signals are also passed to the Stage Queue Selection module which has been extended to support multiple logical client queues for each service class (A, B, or C). The stage queue selections enhancements consist of the following:

The ExamineQueue function specified in the standard's Stage Queue Selection State Machine indicates that a frame is waiting to be sent in the tested service class (A, B, or C). Service classes are checked in priority order. To support the large number of client queues, this function is now expanded to include an arbitration function (e.g. fair round robin) amongst all client queues associated with the service class that is being tested (A,B or C) and for which the qualified frame waiting indications are asserted (as shown above).

In addition to debit indications at the ringlet shaper level, debits are also provided on a per client queue basis so as to control the necessary client level shaper credit reductions during a frame transfer.

This completes the description of the plumbing and functional enhancements required to achieve a two tier traffic management approach. The rest relies on configuration and realtime management of the shapers, that is, the Ringlet Level Shaper Tier and the Client Level Shaper Tier.

The Ringlet Level Shaper tier is configured and managed as described in the standard. The Class-A and Class-B CIR shapers are configured with add rates equal to the sum of the CIRs for the Class-A and Class-B clients SLAs respectively. The Pre and Post Congestion EIR shapers are configured based on the dynamics of the standard Fairness Algorithms and station level weighting. The hilimit and lolimits for the ring level shapers are governed by the equations specified in the standard as described above.

The client level shaper tier must be configured with addrates and bucket thresholds (loLimit and hiLimit). The addrates for these shapers is configured based on the SLA for the given client flow. CIR flows for either Class A or B are simply configured with the CIR values contained in operator's specified SLA. For EIR flows there is quite a bit of flexibility; offering various design alternatives for distribution of the EIR bandwidth available to the station as a whole (i.e. at the ring level). For example, each client associated with an EIR flow could be provisioned with an SLA addrate that represents the maximum allowable EIR usable by the flow; hence acting as a Rate Cap. Other system components which participate in the ring level dynamic allocation of fairness eligible bandwidth could distribute the available EIR BW at the station level among the a EIR client flows up to the limit of the specified Rate Cap or in proportion to this Rate Cap under congestion conditions. These are examples of system level design options that the two tier traffic management approach can support.

The last consideration for client shaper configuration is that of the shaper thresholds. The loLimit is configured identically to that of the ring level shapers (typically 1 MTU) as the need to assert a send indication only after a minimum credit threshold is reached is the same at both tiers. The hiLimit settings for the EIR shapers can also be set identical to that of the ringlet shapers (typically 2 MTU) as for EIR shapers it is simply a means of reducing excessive credit build up. The hiLimit settings for the CIR shapers is where the special needs of a two tier design must be addressed.

As described above, the hiLimit settings for CIR shapers need to be set such that there is adequate credit accumulation above the loLimit to compensate for head of line blocking. For the client side shapers, there are two components that contribute to this head of line blocking; namely, 1. Head of line blocking caused by transit traffic sourced by other stations on the ring
2. Head of line blocking resulting from the arbitration among the client queues within a single station.

These functions are performed according to:

$$\text{Client}X\_hiLimitA = mtuSize +$$

$$[(numClients-1) * mtuSize * Client\_addrateA / addrateA] +$$

$$[numStations * mtuSize / 2 * Client\_addrateA / (lineRate - addrateA)],$$

where
numStations=>Number of RPR Stations on the ring,
mtuSize=>Maximum Transmit Unit Size,
lineRate=>Ring bandwidth,
numClients=>Number of Class A Clients in the client tier, addRateA=>Credit accumulation rate for Class A ringlet shaper (i.e. sum of all Class A Clients), and Client_addRateA=>The Credit accumulation rate for this client shaper.

The term [(numClients−1)*mtuSize*Client_addrateA/addrateA] addresses the credit accumulation needs to compensate for client tier head of line blocking. The term [numStations*mtuSize/2*Client_addrateA/(lineRate−addrateA)] addresses the credit accumulation needs to compensate for ring level head of line blocking.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. Apparatus for Resilient Packet Ring traffic management comprising:
a stage queue selection block operable to hold client and control traffic for transmission and comprising a plurality of client queues, each client queue corresponding to a service level agreement;
a plurality of queue level traffic shapers for each client queue, each queue level traffic shaper operable to control an add rate of client data add traffic and to provide queue specific send indications to the stage queue selection block; and
a ringlet level traffic shaper operable to control traffic flow for a Resilient Packet Ring ringlet and to provide aggregate send indications to the stage queue selection block, wherein each queue level traffic shaper is configured according to:

$$ClientX\_hiLimitA = mtuSize + [(numClients-1)*mtuSize*Client\_addrateA/addrateA] + [numStations*mtuSize/2*Client\_addrateA/(lineRate-addrateA)],$$

wherein numStations equals a number of Resilient Packet Ring Stations on the ring, mtuSize equals a Maximum Transmit Unit Size, lineRate equals a Ring bandwidth, numClients equals a Number of Class A Clients in the client tier, addRateA equals a Credit accumulation rate for Class A ringlet shaper, and Client_addRateA equals a Credit accumulation rate for the queue level traffic shaper.

2. The apparatus of claim 1, wherein the queue level traffic shapers comprise Class-A, Class-B CIR, pre-congestion fairness Eligible, and post-congestion fairness eligible shapers.

3. The apparatus of claim 2, wherein the ringlet level traffic shaper comprises Class-A, Class-B, fairness eligible pre-congestion, fairness eligible post-congestion, MAC Control, downstream, and IDLE shapers.

4. The apparatus of claim 3, further comprising a distinct client instance per service interface, all sharing a station's resources.

5. The apparatus of claim 3, further comprising client instances that share both service interfaces and station resources.

6. The apparatus of claim 1, wherein the queue level traffic shapers are further operable to compensate for client tier head of line blocking and the ringlet level traffic shaper is further operable to compensate for ring level head of line blocking.

7. The apparatus of claim 6, wherein the queue level traffic shapers are further operable to be configured based on a client level service level agreement and the ringlet level traffic shaper is further operable to be configured to handle aggregate station level traffic management.

8. The apparatus of claim 6, wherein the queue level traffic shapers comprise Class-A, Class-B CIR, pre-congestion fairness Eligible, and post-congestion fairness eligible shapers.

9. The apparatus of claim 8, wherein the ringlet level traffic shaper comprises Class-A, Class-B, fairness eligible pre-congestion, fairness eligible post-congestion, MAC Control, downstream, and IDLE shapers.

10. A method for Resilient Packet Ring traffic management comprising:
holding client and control traffic for transmission in a stage queue selection block comprising a plurality of client queues, each client queue corresponding to a service level agreement;
controlling, in a plurality of queue level traffic shapers for each client queue, an add rate of client data add traffic providing queue specific send indications to the stage queue selection block, wherein the queue level traffic shaper is configured according to:

$$ClientX\_hiLimitA = mtuSize + [(numClients-1)*mtuSize*Client\_addrateA/addrateA] + [numStations*mtuSize/2*Client\_addrateA/(lineRate-addrateA)],$$

wherein numStations equals a number of Resilient Packet Ring Stations on the ring, mtuSize equals a Maximum Transmit Unit Size, lineRate equals a Ring bandwidth, numClients equals a Number of Class A Clients in the client tier, addRateA equals a Credit accumulation rate for Class A ringlet shaper, and Client_addRateA equals a Credit accumulation rate for the queue level traffic shaper; and
controlling traffic flow for a Resilient Packet Ring ringlet and to provide aggregate send indications to the stage queue selection block in a ringlet level traffic shaper.

11. The method of claim 10, wherein the queue level traffic shapers comprise Class-A, Class-B CIR, pre-congestion fairness Eligible, and post-congestion fairness eligible shapers.

12. The method of claim 11, wherein the ringlet level traffic shaper comprises Class-A, Class-B, fairness eligible pre-congestion, fairness eligible post-congestion, MAC Control, downstream, and IDLE shapers.

13. The method of claim 12, further comprising:
using a distinct client instance per service interface.

14. The method of claim 12, further comprising:
using client instances that share both a common service interface and station resources.

15. The method of claim 10, further comprising:
compensating for client tier head of line blocking in the queue level traffic-shapers; and
compensating for ring level head of line blocking in the ringlet level traffic shaper.

16. The method of claim 15, further comprising:
configuring the queue level traffic based on a client level service level agreement; and
configuring the ringlet level traffic shaper to handle aggregate station level traffic management.

17. The method of claim 15, wherein the queue level traffic shapers comprise Class-A, Class-B CIR, pre-congestion fairness Eligible, and post-congestion fairness eligible shapers.

18. The method of claim 17, wherein the ringlet level traffic shapers comprise Class-A, Class-B, fairness eligible pre-congestion, fairness eligible post-congestion, MAC Control, downstream, and IDLE shapers.

19. Apparatus for Resilient Packet Ring traffic management comprising:

a stage queue selection block operable to hold client and control traffic for transmission;

a queue level traffic shaper operable to control an add rate of client data add traffic and to provide queue specific send indications to the stage queue selection block; and a ringlet level traffic shaper operable to control traffic flow for a Resilient Packet Ring ringlet and to provide aggregate send indications to the stage queue selection block, wherein the queue level traffic shaper is further operable to be configured according to:

$$ClientX\_hiLimitA = mtuSize + [(numClients-1) * mtuSize * Client\_addrateA/addrateA] + [numStations * mtuSize/2 * Client\_addrateA/(lineRate - addrateA)],$$

wherein numStations equals a number of Resilient Packet Ring Stations on the ring, mtuSize equals a Maximum Transmit Unit Size, lineRate equals a Ring bandwidth, numClients equals a Number of Class A Clients in the client tier, addRateA equals a Credit accumulation rate for Class A ringlet shaper, and Client_addRateA equals a Credit accumulation rate for the queue level traffic shaper.

20. A method for Resilient Packet Ring traffic management comprising:

holding client and control traffic for transmission in a stage queue selection block;

controlling an add rate of client data add traffic and to provide queue specific send indications to the stage queue selection block in a queue level traffic shaper, wherein the queue level traffic shaper is configured according to:

$$ClientX\_hiLimitA = mtuSize + [(numClients-1) * mtuSize * Client\_addrateA/addrateA] + [numStations * mtuSize/2 * Client\_addrateA/(lineRate - addrateA)],$$

wherein numStations equals a number of Resilient Packet Ring Stations on the ring, mtuSize equals a Maximum Transmit Unit Size, lineRate equals a Ring bandwidth, numClients equals a Number of Class A Clients in the client tier, addRateA equals a Credit accumulation rate for Class A ringlet shaper, and Client_addRateA equals a Credit accumulation rate for the queue level traffic shaper; and controlling traffic flow for a Resilient Packet Ring ringlet and to provide aggregate send indications to the stage queue selection block in a ringlet level traffic shaper.

* * * * *